United States Patent
Adachi et al.

[11] Patent Number: 5,951,438
[45] Date of Patent: Sep. 14, 1999

[54] DRIVE FORCE CONTROL DEVICE FOR A VEHICLE EQUIPPED WITH AN ANTILOCK BRAKE SYSTEM

[75] Inventors: Kazutaka Adachi, Kanagawa; Ken Itou, Tokyo, both of Japan

[73] Assignee: Nissan Motor Co., Ltd., Yokohama, Japan

[21] Appl. No.: 09/132,764

[22] Filed: Aug. 12, 1998

[30] Foreign Application Priority Data

Aug. 12, 1997 [JP] Japan .................................. 9-217741

[51] Int. Cl.$^6$ .................................................. F16H 61/00
[52] U.S. Cl. ............................ 477/47; 477/110; 477/4; 701/85
[58] Field of Search .................... 477/43–49, 110; 701/71, 83, 85, 88

[56] References Cited

U.S. PATENT DOCUMENTS 5,012,910   5/1991   Miyawaki ............................ 477/49 X
5,109,962   5/1992   Sato .................................... 477/49 X

FOREIGN PATENT DOCUMENTS 3-79851   4/1991   Japan .

*Primary Examiner*—Khoi Q. Ta
*Attorney, Agent, or Firm*—Foley & Lardner

[57] ABSTRACT

A vehicle having an antilock brake system to control a brake so as to suppress locking of wheels when a slip ratio of the wheels exceeds a predetermined value is also provided with a continuously variable transmission (CVT). When antilock brake control is being performed, a drive shaft torque controller computes a command torque of an engine and command drive ratio of the CVT so that a drive shaft torque is a predetermined torque. An engine controller controls the engine according to the command torque and a CVT controller controls the transmission according to the command drive ratio.

4 Claims, 10 Drawing Sheets

DRIVE FORCE CONTROL DEVICE FOR A VEHICLE EQUIPPED WITH AN ANTILOCK BRAKE SYSTEM

FIELD OF THE INVENTION

The present invention relates to a drive force control device, and in particular, to a drive force control device for a vehicle equipped with an antilock brake system and a continuously variable transmission.

BACKGROUND OF THE INVENTION

In a vehicle, an antilock brake system (ABS) loosens brakes when a tire locks while braking, and applies the brakes again when the tire begins to turn. The ABS operates so that a tire can exert the greatest frictional force. Therefore, when the vehicle is braked on a wet or frozen road where it tends to slip, there is an advantage that the braking distance becomes shorter and the steering control is maintained.

However when a large engine brake acts during antilock brake control, the same state is obtained as when the foot brakes are applied, and the recovery of the tires from the locked state is delayed even if the ABS loosens the brakes. When recovery of the tires from the locked state is delayed, the ABS does not exhibit its true performance.

Tokkai Hei 3-79851 published by the Japanese Patent Office in 1991 discloses that the effect of the engine brake is suppressed by reducing a drive ratio of the CVT transmission during the antilock brake control. Herein, the drive ratio corresponds to a gear ratio in the conventional transmission.

SUMMARY OF THE INVENTION

However, even in such a case, when a driver releases his foot from an accelerator pedal, the engine rotation speed falls, and a large engine brake is applied.

It is therefore an objective of this invention to further reduce the effect of an engine brake during antilock brake control.

In order to achieve object, this invention provides a drive force control device for use with a vehicle comprising an engine, a drive shaft driven by the engine, drive wheels connected to the drive shaft, a continuously variable transmission which continuously varies a drive ratio, and a brake which brakes the drive wheels. The device comprises a sensor for detecting a running state of the vehicle, an engine controller for controlling a torque of the engine according to the vehicle running state, a CVT controller for controlling the drive ratio according to the vehicle running state, and an ABS controller for detecting a slip ratio of the drive wheels and controlling the brake to suppress the locking of the drive wheels when the slip ratio exceeds a predetermined threshold value. The device further comprises a drive shaft torque controller programmed to compute a command torque of the engine and a command drive ratio of the transmission so that a torque of the drive shaft is a predetermined torque while the ABS controller is performing antilock brake control, output the command torque to the engine controller, and output the command drive ratio to the CVT controller.

The details as well as other features and advantages of this invention are set forth in the remainder of the specification and are shown in the accompanying drawings.

DESCRIPTION OF THE PREFERRED EMBODIMENTS

Figure 1:
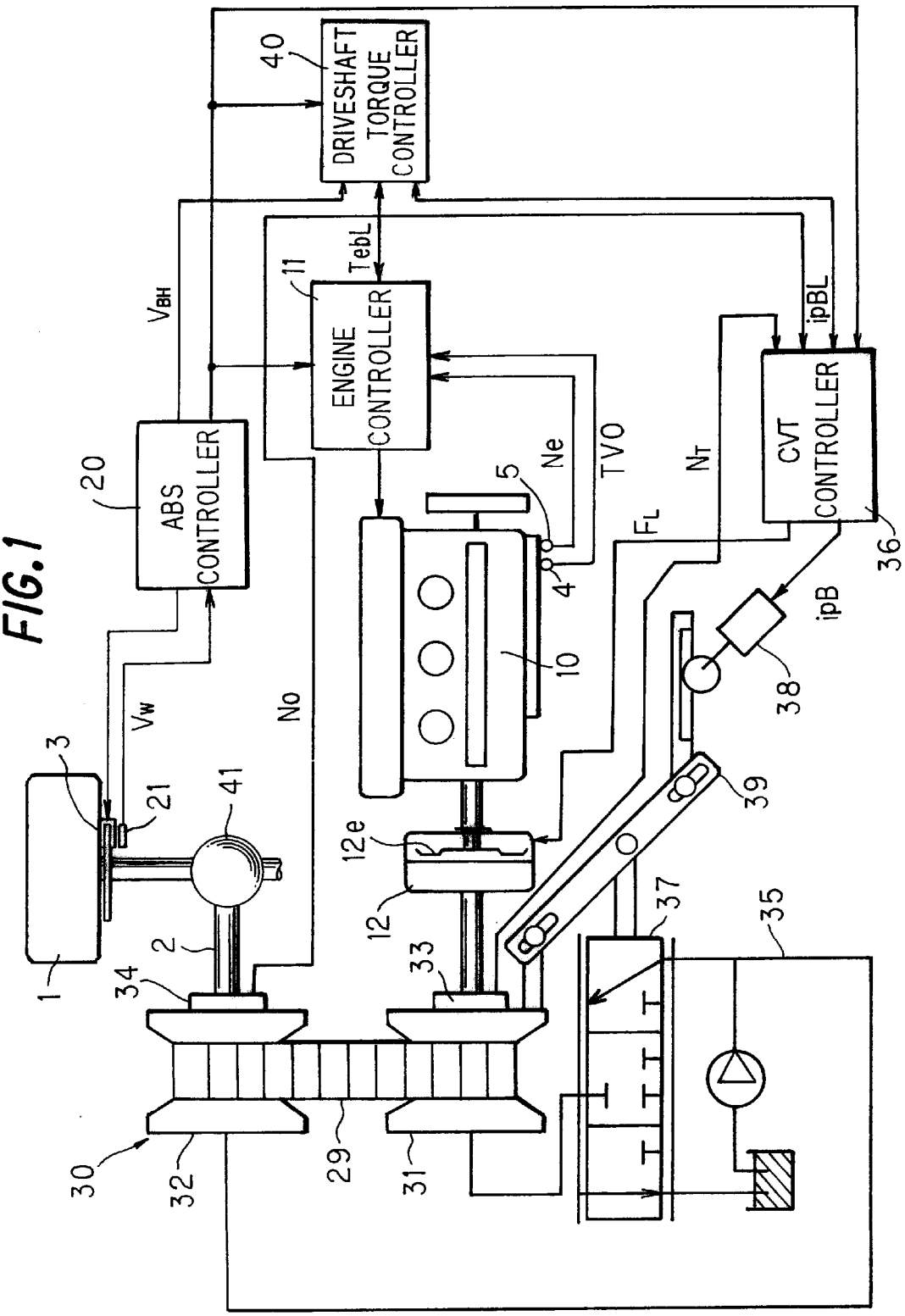
FIG. 1 is a schematic diagram of a vehicle drive force control device according to this invention.

Referring to FIG. 1 of the drawings, a vehicle with an antilock brake system (ABS) is provided with a V belt type Continuously Variable Transmission (CVT) 30.

The CVT 30 is connected to an engine 10 via a torque converter 12 with a lockup clutch 12e. The CVT 30 is provided with a primary pulley 31 connected to a turbine of the torque converter 12 and a secondary pulley 32 connected to drive wheels 1 via a drive shaft 2 and differential gear unit 41. These pulleys 31, 32 are connected by a V belt 29.

The CVT 30 is controlled by a CVT controller 36, and the engine 10 is controlled by an engine controller 11.

The drive wheels 1 and driven wheels, not illustrated, are respectively provided with a brake 3 and wheel speed sensor 21. Based on a wheel speed Vw detected by the wheel speed sensor 21 and estimated vehicle speed VBH, an ABS controller 20 controls the brake 3 so as to maintain a predetermined slip ratio at which the wheels do not lock during braking.

The ABS controller 20 sets an ABS flag to ON during antilock brake control, and informs the engine controller 11, the CVT controller 36 and a drive shaft torque controller 40 that antilock brake control is being performed.

When the ABS flag is ON, the drive shaft torque controller 40 computes a command torque TebL of the engine 10 and a command drive ratio ipBL of the CVT 30 according to a running state at that time, and issues commands to the engine controller 11 and CVT controller 36 respectively. The drive shaft torque controller 40 controls the engine 1 and CVT 30 via the engine controller 11 and CVT controller 36 during antilock brake control so that the drive shaft torque becomes a torque which does not cause the engine brake to operate. It also increases a drive ratio of the CVT 30 smoothly to a maximum for starting again after stopping.

The drive ratio (pulley ratio) of the CVT 30 is controlled by a speed change control valve 37. A line pressure circuit 35 supplies line pressure via a line pressure control mechanism, not illustrated, to a cylinder chamber, not shown, and speed change control valve 37 of the secondary pulley 32.

The speed change control valve 37 is driven by a stepping motor 38 according to a target drive ratio ipB or target primary rotation speed from the CVT controller 36. As a result, the speed change control valve 37 increases and decreases oil pressure of a cylinder chamber of the primary pulley 31 and the pulley width is set to a width according to the target drive ratio ipB.

A spool of the speed change control valve 37 and the stepping motor 38 are connected by a link 39. The primary pulley 31 is connected to one end of the link 39, and a real drive ratio ip is fed back to the speed change control valve 37 via the link 39. When the target drive ratio ipB and real drive ratio ip coincide, the speed change control valve 37 blocks the oil pressure given to the primary pulley 31, and maintains the drive ratio at that time.

The CVT controller 36 reads a signal from a primary pulley rotation speed sensor 33 which detects a rotation speed Nt of the primary pulley 31 of the CVT 30, secondary pulley rotation speed sensor 34 which detects a rotation speed No of the secondary pulley 32, inhibitor switch, not shown, which detects a selector lever position, and a throttle opening sensor 4 which detects a throttle opening TVO according to a depression of an accelerator pedal operated by a driver, and controls the real drive ratio ip according to the running state of the vehicle. In this embodiment, the value obtained by multiplying the rotation speed No of the secondary pulley 32 by a predetermined constant is used as a vehicle speed VSP.

The CVT controller 36 engages and releases the lockup clutch 12e of the torque converter 12 according to running conditions such as vehicle speed VSP or throttle opening TVO. An engaging force FL of the lockup clutch 12e is controlled by solenoids in a hydraulic control circuit, not illustrated.

The engine controller 11 controls a fuel injection amount and ignition timing according to running conditions such as the throttle opening TVO or degree of the accelerator pedal depression, engine rotation speed Ne from an engine rotation speed sensor 5, and intake air amount Qa.

The ABS controller 20 detects respective speeds Vw of the drive wheels 1 and driven wheels, not shown, by the wheel speed sensors 21. The largest wheel speed is taken as the estimated vehicle speed VBH, and this estimated vehicle speed VBH is output to the drive shaft torque controller 40.

When the ratio of the deviation between the wheel speed Vw and estimated vehicle speed VBH to the wheel speed Vw, i.e. the slip ratio Ws, exceeds a predetermined value, the ABS controller 20 determines that the vehicle is slipping, increases or decreases the braking force of the brake 3, and controls the slip ratio Ws not to exceed the pre determined value.

The ABS controller 20 switches the ABS flag to ON during the aforesaid antilock brake control, and informs the controllers 11, 36, 40 that antilock brake control is being performed. When the ABS flag is ON, the engine controller 11 and CVT controller 36 control the engine 10, CVT 36 and lockup clutch 12e respectively based on the command value output from the drive shaft torque controller 40.

The engine controller 11, CVT controller 36, ABS controller 20 and drive shaft torque controller 40 transmit and receive data to and from each other.

Next, the engine torque control process performed by the engine controller 11 will be described referring to the flowchart shown by FIG. 2. This process is performed repeatedly at a predetermined interval, for example, every 10 milliseconds.

In a step S1, it is determined whether or not the aforesaid predetermined time has elapsed. If the predetermined time has elapsed, the routine proceeds to a step S2.

In the step S2, various engine conditions are read such as the engine rotation speed Ne, throttle opening TVO and intake air amount Qa.

In a step S3, the fuel injection amount and ignition timing are determined according to a target torque Teb computed in a step S8, described hereafter and the torque of the engine 10 is controlled.

In a step S4, an estimated torque Teo of the engine 10 is estimated from the throttle opening TVO and engine rotation speed Ne by referring to a map, not shown.

In a step S5, the ABS flag is read, and if the ABS flag is ON, i.e. if antilock brake control is being performed, the routine proceeds to a step S6. If the ABS flag is OFF, the routine proceeds to a step S8.

In the step S6, it is determined whether or not the throttle opening TVO is less than a predetermined value, for example, ⅛. If the throttle opening TVO is less than the predetermined value, i.e. if the vehicle is braking with the throttle closed or almost closed, the routine proceeds to a step S7. On the other hand, if the throttle opening TVO is more than the predetermined value, the routine proceeds to the step S8.

In the step S7, the command torque TebL from the drive shaft torque controller 40 read by communication processing described hereafter, is substituted for the target torque Teb used for in the next step S3, and the routine returns to the start.

On the other hand, in the step S8, as the vehicle is in the ordinary running state, the target torque Teb is computed based on the conditional parameters read in the step S2, and the routine returns to the start.

Figure 3:
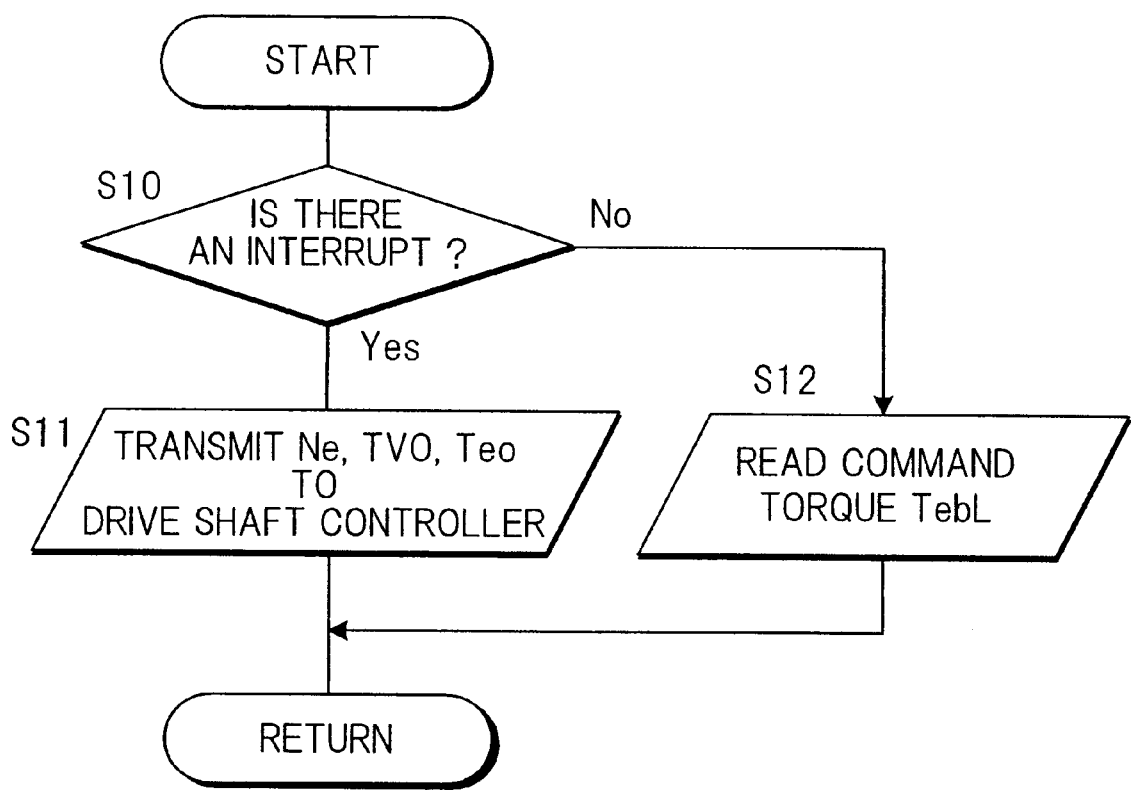
FIG. 3 is a flowchart describing a communication process performed by the engine controller.

Next, the communication process with the drive shaft torque controller 40 performed by the engine controller 11 will be described referring to the flowchart shown by FIG. 3. This process is performed when there is an interrupt at a predetermined interval or a signal transmission from the drive shaft torque controller 40.

In a step S10, if there is an interrupt at a predetermined interval, the routine proceeds to a step S11, otherwise the routine proceeds to a step S12.

Figure 2:
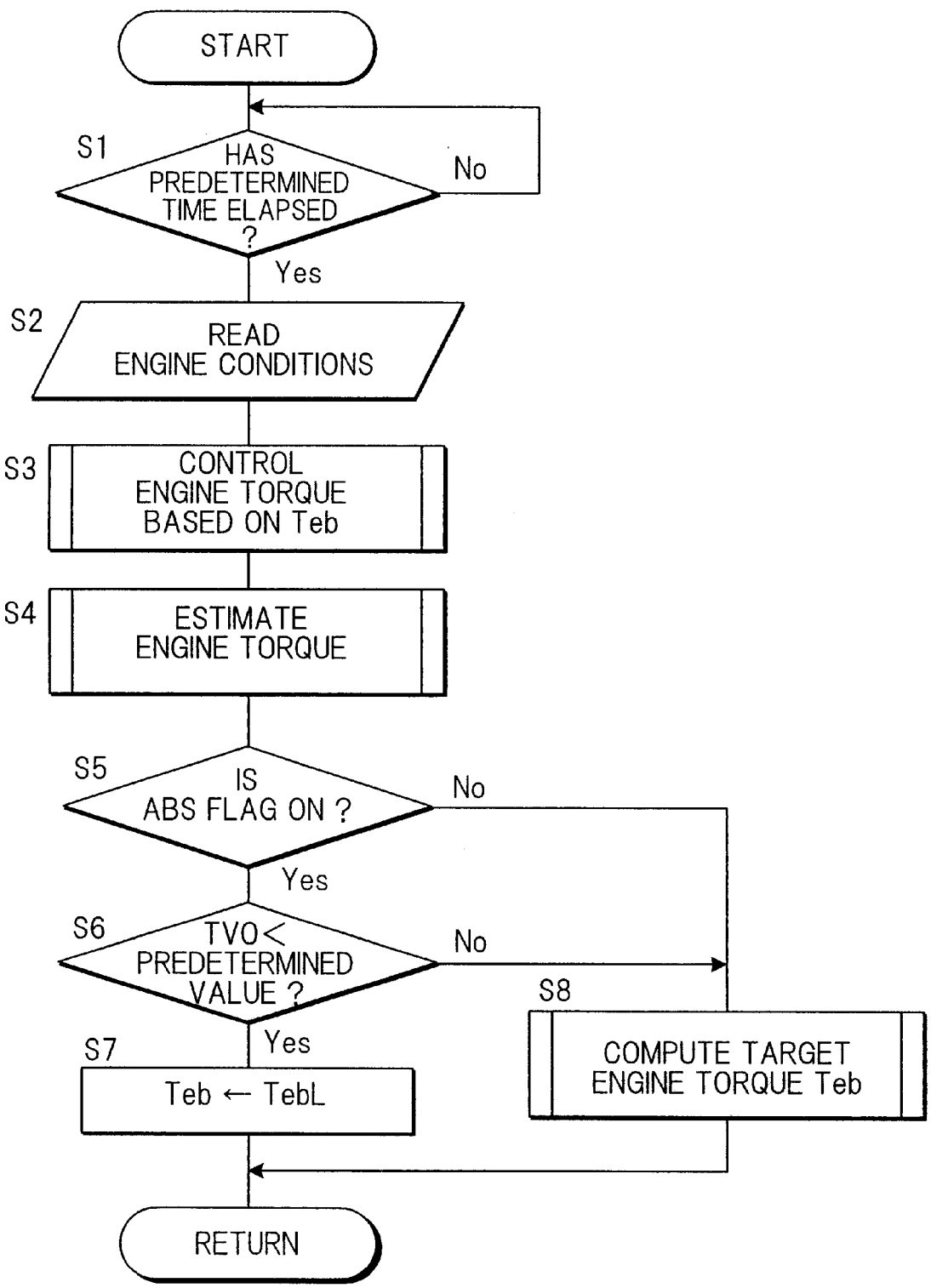
FIG. 2 is a flowchart describing an engine torque control process performed by an engine controller according to this invention.

In the step S11, the engine rotation speed Ne and throttle opening TVO read in the step S2, and the estimated torque Teo of the engine 10 estimated in the step S4 of FIG. 2, are transmitted to the drive shaft torque controller 40, and the routine returns to the start.

In the step S12, the command torque TebL of the engine 10 transmitted by the drive shaft torque controller 40 is read, and the routine returns to the start.

Therefore, when antilock brake control is being performed and the throttle opening TVO is less than a predetermined value, the engine controller 11 controls the torque of the engine 10 based on the command torque TebL transmitted by the drive shaft torque controller 40. On the other hand, in the usual running state, the torque of the engine 10 is controlled based on the conditional parameters read in the step S2.

Next, the drive ratio control process of the CVT 30 performed by the CVT controller 36 will be described referring to the flowchart shown by FIG. 4. This process is performed repeatedly at a predetermined interval, for example, every 10 milliseconds.

In a step S20, it is determined whether or not the aforesaid predetermined time has elapsed. If the predetermined time has elapsed, the routine proceeds to a step S21 where conditional parameters of the engine 10 such as the throttle opening TVO, and conditional parameters of the CVT 30 such as the primary pulley rotation speed Nt, secondary pulley rotation speed No, and engaging force FL of the lockup clutch 12e, are read. The real drive ratio ip is computed from the ratio of the primary pulley rotation speed Nt and secondary pulley rotation speed No. The vehicle speed VSP is then computed by multiplying the secondary rotation speed No by a predetermined constant. The engaging force FL of the lockup clutch 12e is determined according to a pressure-receiving area of the lockup clutch 12e, which is already known, and lockup pressures computed from duty ratios of solenoids.

In a step S22, the ABS flag is read, and when the ABS flag is ON, i.e. when antilock control is being performed, the routine proceeds to a step S23. On the other hand, when the ABS flag is OFF, i.e. when during ordinary running, the routine proceeds to a step S30.

In the step S23, the value of a counter ACNT is determined. When the counter ACNT is 0, it is determined that this is the first occasion the process is performed since antilock brake control started, and the routine proceeds to a step S25. On the other hand when the counter ACNT is not 0, it is determined that this is not the first occasion the process is performed after starting antilock brake control, and the routine proceeds to a step S24.

In the step S25, it is determined whether the selector lever is in a D range. When the selector lever is in the D range, the routine proceeds to a step S26 and the current target drive ratio ipB is maintained, and the routine proceeds a step S28. On the other hand when this is not so, for example, in other ranges where the drive ratio is set relatively large, the routine proceeds to a step S27, the target drive ratio ipB is decreased a predetermined amount from the current value, and the routine proceeds to the step S28.

In the step S24, the command drive ratio ipBL transmitted from the drive shaft torque controller 40 is substituted for the target drive ratio ipB, the counter ACNT is increased, and the routine proceeds to a step S29.

In a step S30, the target drive ratio ipB is computed based on the conditional parameters of the engine 10 and CVT 30 read in the aforesaid step S21. This target drive ratio ipB is computed for example by referring to a preset map from the throttle opening TVO and target primary rotation speed tNt according to the vehicle speed VSP. After setting the target drive ratio ipB during normal running, the counter ACNT is reset to 0 in a step S31, and the routine proceeds to the step S29.

In the step S29, the stepping motor 38 is driven to drive the speed change control valve 37 based on the target drive ratio ipB determined in any of the aforesaid steps S24, S26, S27, S30 and the contact radius between the primary pulley 31 and V belt 29 is varied so as to continuously vary the drive ratio.

Figure 5:
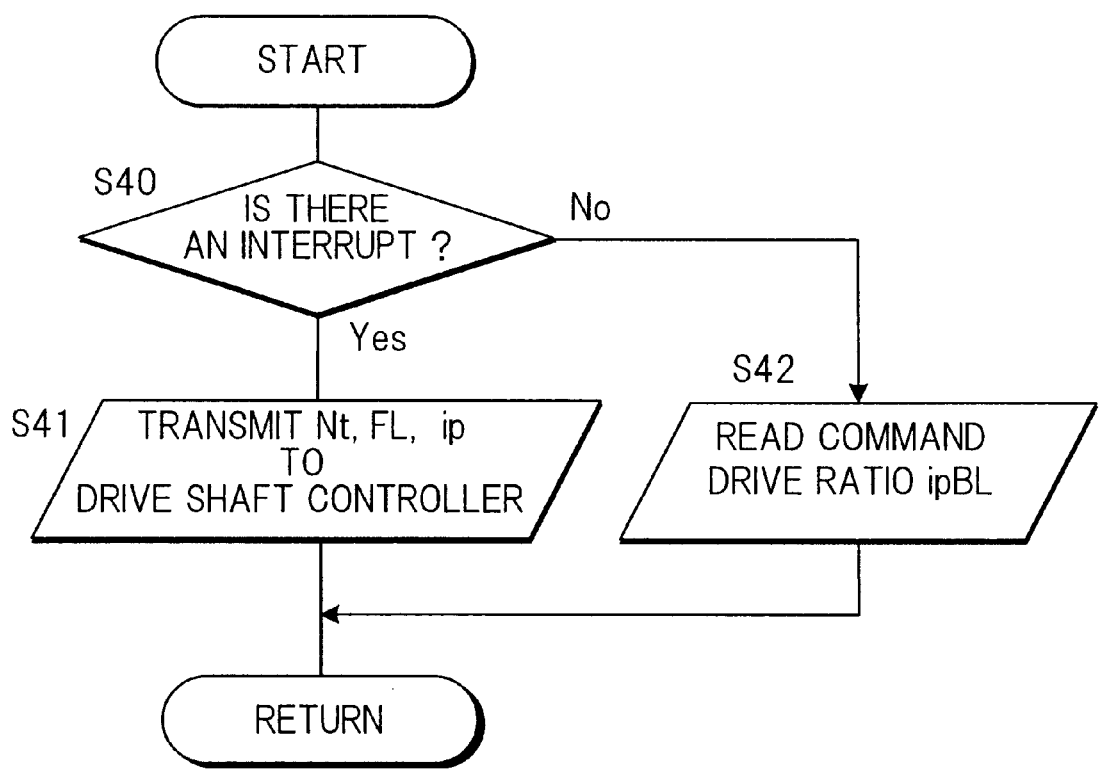
FIG. 5 is a flowchart describing a communication process performed by the CVT controller.

Next, the communication process with the drive shaft torque controller 40 performed by the CVT controller 36 will be described referring to the flowchart shown in FIG. 5. This process is performed when there is an interrupt in a predetermined interval or a signal transmission from the drive shaft torque controller 40.

If an interrupt is performed in a predetermined interval in a step S40, the routine proceeds to a step S41, otherwise the routine proceeds to a step S42.

Figure 4:
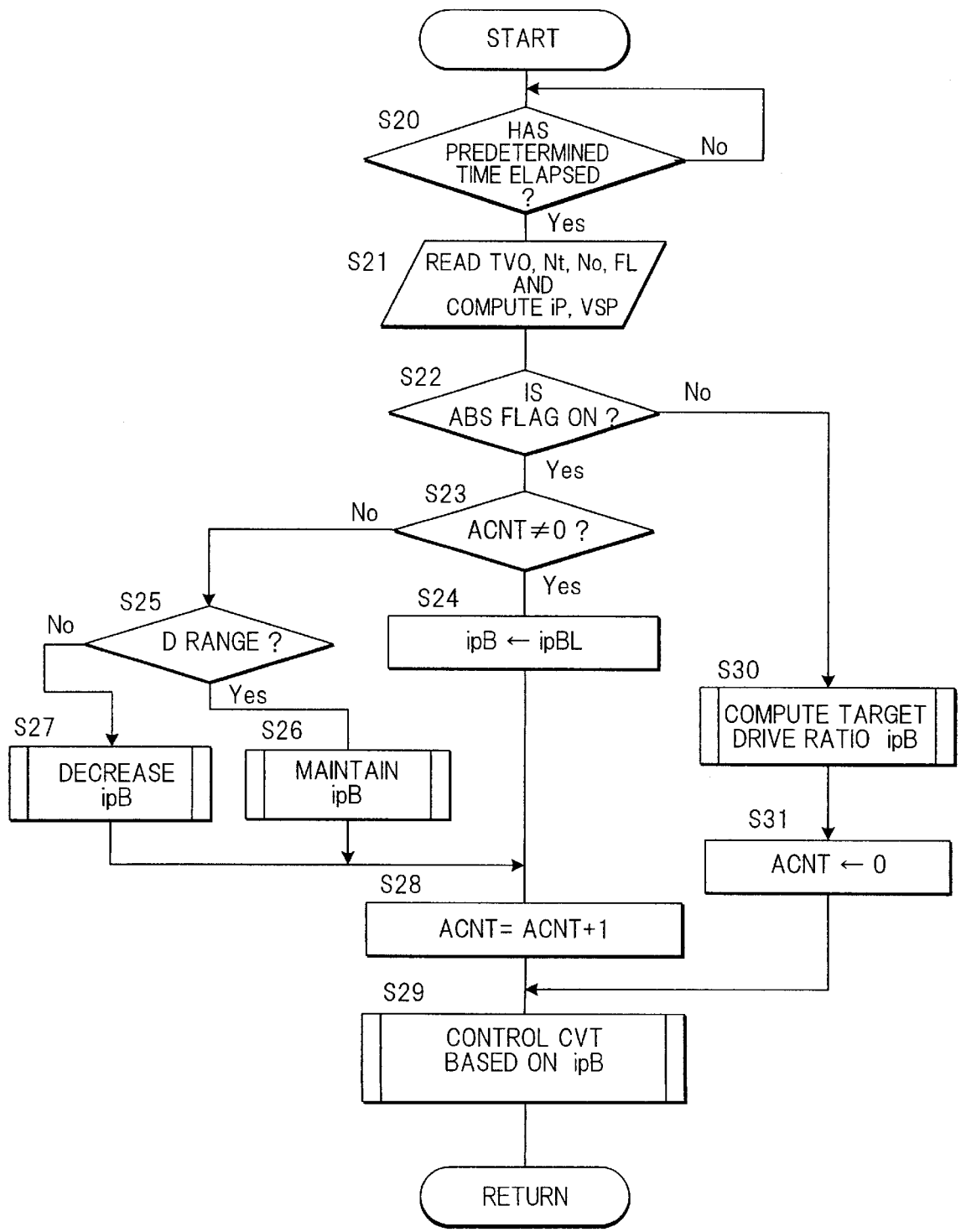
FIG. 4 is a flowchart describing a drive ratio control process performed by a CVT controller according to this invention.

In the step S41, the primary pulley rotation speed Nt, engaging force FL of the lockup clutch 12e and real drive ratio ip read in the step S21 of the aforesaid FIG. 4 are transmitted to the drive shaft torque controller 40, and the routine returns to the start.

In the step S42, the command drive ratio ipBL transmitted from the drive shaft torque controller 40 is read, and the routine returns to the start.

Therefore, immediately after antilock brake control is started, the CVT controller 36 maintains the target drive ratio ipB or upshifts it by a predetermined amount according to the selector lever position, and suppresses increase of the engine brake. Subsequently, the drive ratio of the CVT 30 is changed using the command drive ratio ipBL transmitted from the drive shaft torque controller 40 as the target drive ratio ipB. On the other hand, under usual running conditions, the CVT 30 is controlled according to the target drive ratio ipB based on the usual conditional parameters read in the step S21.

Next, the drive shaft torque control process performed by the drive shaft torque controller 40 will be described referring to a flowchart shown in FIG. 6. This process is performed repeatedly at a predetermined interval, for example, every 10 milliseconds.

In a step S50, it is determined whether or not the aforesaid predetermined time has elapsed. When the predetermined time has elapsed, the routine proceeds to a step S51.

In the step S51, a current drive shaft torque TDH is computed based on conditional parameters from the engine controller 11 and controller 36, and the estimated vehicle speed VBH from the ABS controller 20.

After determining whether the torque converter 12 is in a lockup state or an unlocked state from the engine rotation speed Ne, primary pulley rotation speed Nt and lockup clutch engaging force FL, computation of the drive shaft torque TDH is performed according to the determined conditions.

When the aforesaid conditional parameters satisfy the following relation, the lockup state is determined to hold, otherwise an unlocked state is determined to hold.

$$|Ne-Nt| < Ne_{CST} \text{ and } FL > FL_{CST} \tag{1}$$

where:

$Ne_{CST}$=a threshold value of the deviation between the engine rotation speed Ne and primary pulley rotation speed Nt; and $FL_{CST}$=a threshold value determined according to the engine torque Te, engine load or throttle opening TVO.

In other words, when the deviation between the engine rotation speed Ne and primary pulley rotation speed Nt is less than the threshold value $Ne_{CST}$, and the engaging force FL exceeds the threshold value $FL_{CST}$, it is determined that the lockup state holds.

Next, the drive shaft torque TDH is computed according to the state of the torque converter 12.

[Drive shaft torque TDH in lockup state]

As the engine torque Te is not amplified in the lockup state of the torque converter 12, the drive shaft torque TDH is computed by the following equation.

$$TDH = Teo \cdot \eta_{CVT} \cdot ip \cdot \eta_{FG} \cdot i_{FG} \tag{2}$$

where:

$\eta_{CVT}$=transmission efficiency of CVT 30;
$\eta_{FG}$=transmission efficiency of differential gear unit 41;
$i_{FG}$=gear ratio of differential gear unit 41.

[Drive Shaft Torque TDH in Unlocked State]

First, as amplification of the engine torque Te due to the torque converter 12 is performed in the unlocked state of the lockup clutch 12e, computing of the output torque $T_{TC}$ of the torque converter 12 is performed by the following equation.

$$T_{TC}=T_{TA} \cdot R_{TC} \tag{3}$$

where:
$T_{TA}$=torque capacity of torque converter 12;
$R_{TR}$=torque ratio of torque converter 12.

Figure 8:
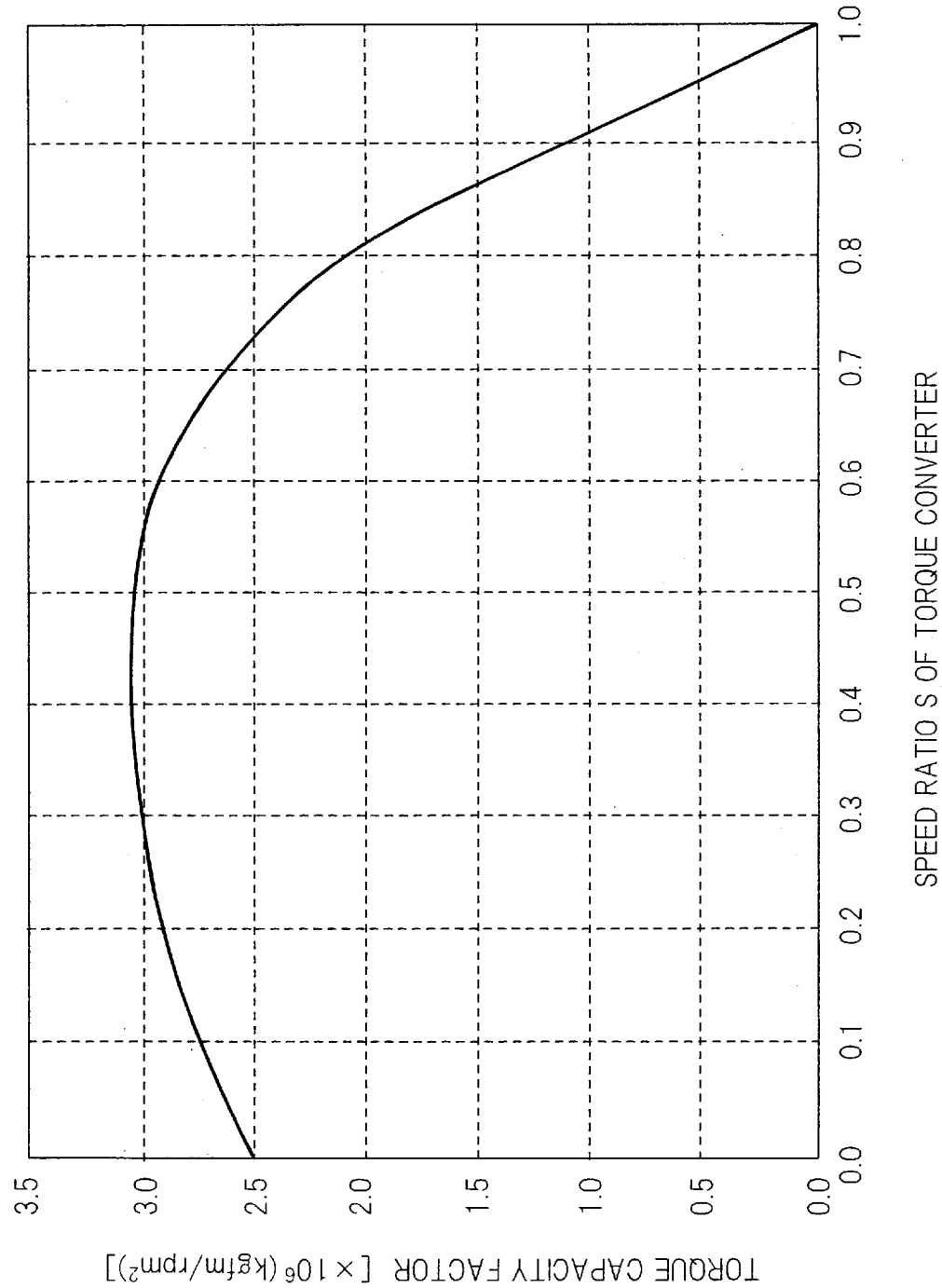
FIG. 8 is a map stored in the drive shaft torque controller specifying a relation between a speed ratio and torque capacity factor of a torque converter.

Here, the torque capacity of the torque converter 12 may be computed by the following equation referring to the map of FIG. 8.

$$T_{TA}=\text{map1}(S) \times Ne^2 \tag{4}$$

where:
S=speed ratio between an impeller and turbine of the torque converter, i. e. the ratio of the primary pulley rotation speed Nt to the engine rotation speed Ne; and
map1 (1)=value obtained from the map based on the speed ratio S.

Figure 9:
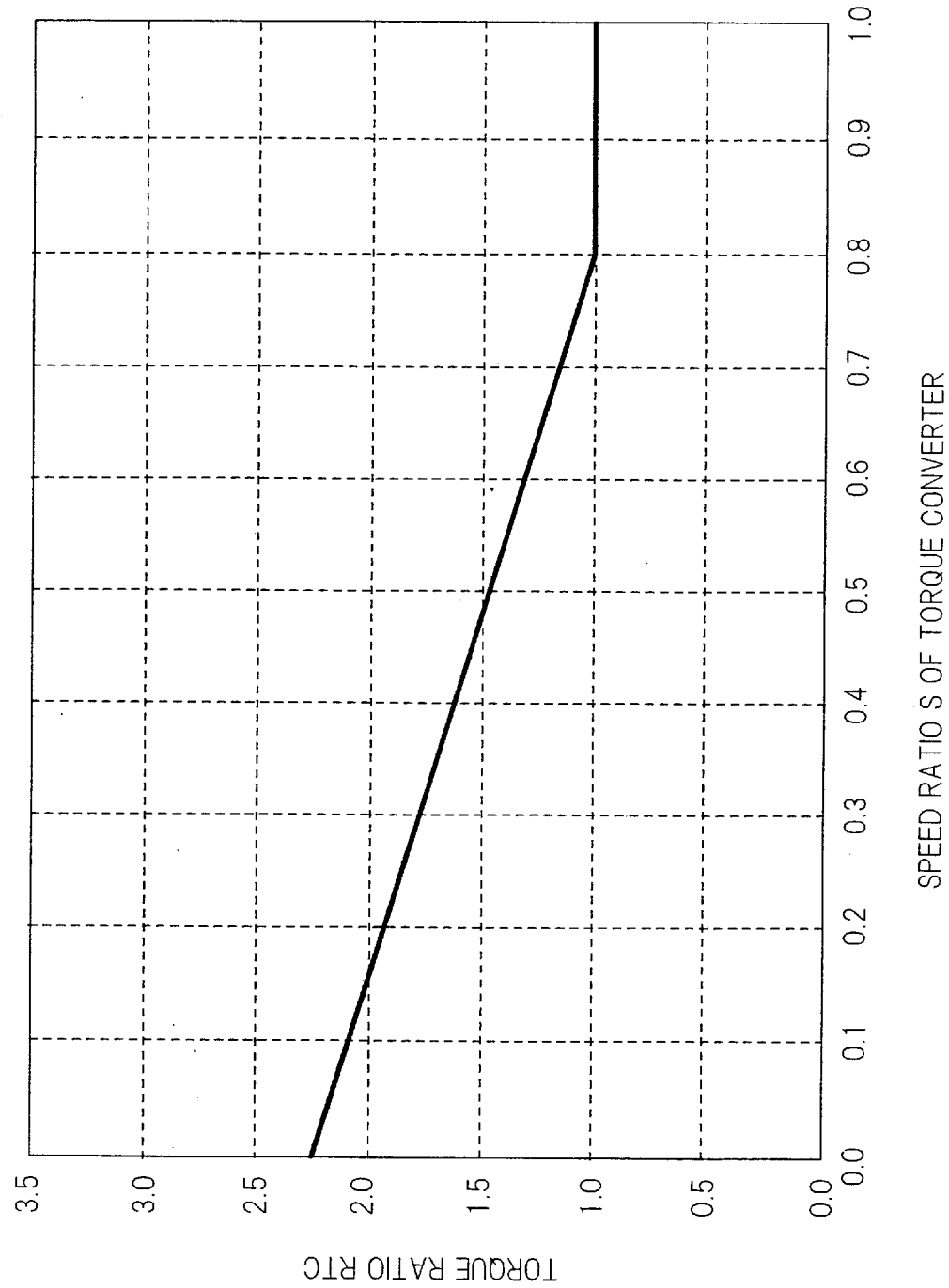
FIG. 9 is a map stored in the drive shaft torque controller specifying a relation between the speed ratio and torque ratio of the torque converter.

The torque ratio $R_{TC}$ of the torque converter 12 may be computed by the following equation based on the speed ratio S=Nt/Ne of the torque converter 12 referring to the map of FIG. 9.

$$R_{TC}=\text{map2}(S) \tag{5}$$

where: map2 (S)=value obtained from the map based on the speed ratio S.

Therefore, the drive shaft torque TDH in the unlocked state is given by the following equation.

$$TDH=T_{TC} \cdot \eta_{CVT} \cdot iP \cdot \eta_{FG} \cdot i_{FG} \tag{6}$$

The torque capacity factor of FIG. 8 and the torque ratio $R_{TC}$ of FIG. 9 are preset according to the characteristics of the torque converter 12.

In a step S52, it is determined if the ABS flag is ON, i.e. if antilock brake control is being performed. When the ABS flag is ON, the routine proceeds to a step S53. On the other hand, when the ABS flag is OFF, the routine proceeds to a step S61, the counter ACNTis reset to 0 and the routine returns to the start.

In the step S53, it is determined whether or not the throttle opening TVO is less than a predetermined value, for example, ⅛. If braking is performed when the throttle opening TVO is less than the predetermined value, i.e. when the throttle is closed or almost closed, the routine proceeds to a step S54. On the other hand, when the throttle opening TVO is equal to or greater than the predetermined value, the routine proceeds to a step S60. In the step S60, the command drive ratio ipBL is computed based on conditional parameters, the counter ACNT is reset to 0 in the step S61, and the routine returns to the start.

In the step S54, the value of the counter ACNT is determined. When the counter ACNT is 0, it is determined that this is the first occasion the process is performed after starting antilock brake control, and the routine proceeds to a step S55. On the other hand when the counter ACNT is not 0, it is determined that this is not the first occasion the process is performed after starting antilock brake control, and the routine proceeds to a step S56.

In the step S55, the drive shaft torque TDH computed in the step S51 is stored as a drive shaft torque TDHM immediately before starting antilock brake control, and the routine proceeds to the step S56.

In the step S56, the drive shaft torque TDHM immediately prior to start of antilock brake control is set to the target drive shaft torque TDB. Alternatively, the target drive shaft torque TDB may be computed based on a map from the estimated vehicle speed VBH and the throttle opening TVO.

$$TDB=\text{map}(TDHM, VBH, TVO) \tag{7}$$

where: map ( TDHM, VBH, TVO)=value obtained from the map based on TDHM, VBH and TVO.

In a step S57, the command drive ratio ipBL is computed based on the estimated vehicle speed VBH by referring to a map or a function.

In a step S58, the command torque TebL of the engine 10 is computed as follows from the command drive ratio ipBL according to the lockup state of the torque converter 12 so that the target drive shaft torque TDB is achieved.

(i) For lockup state:

$$TebL=TDB/(\eta_{CVT} \cdot ipBL \cdot \eta_{FG} \cdot i_{FG}) \tag{8}$$

(ii) For unlocked state:

$$TebL=TDB/(R_{TC} \cdot \eta_{CVT} \cdot ipBL \cdot \eta_{FG}1)i_{FG}) \tag{9}$$

where the command torque TebL of the engine 10 is limited to a value such that the engine rotation speed Ne lies within a predetermined range, i.e. a value which does not exceed an upper limit rotation speed and idle rotation speed.

After having computed the command drive ratio ipBL of the CVT 30 and command torque TebL of the engine 10 in this way, the counter ACNT is increased in a step S59, and the routine returns to the start.

Figure 7:
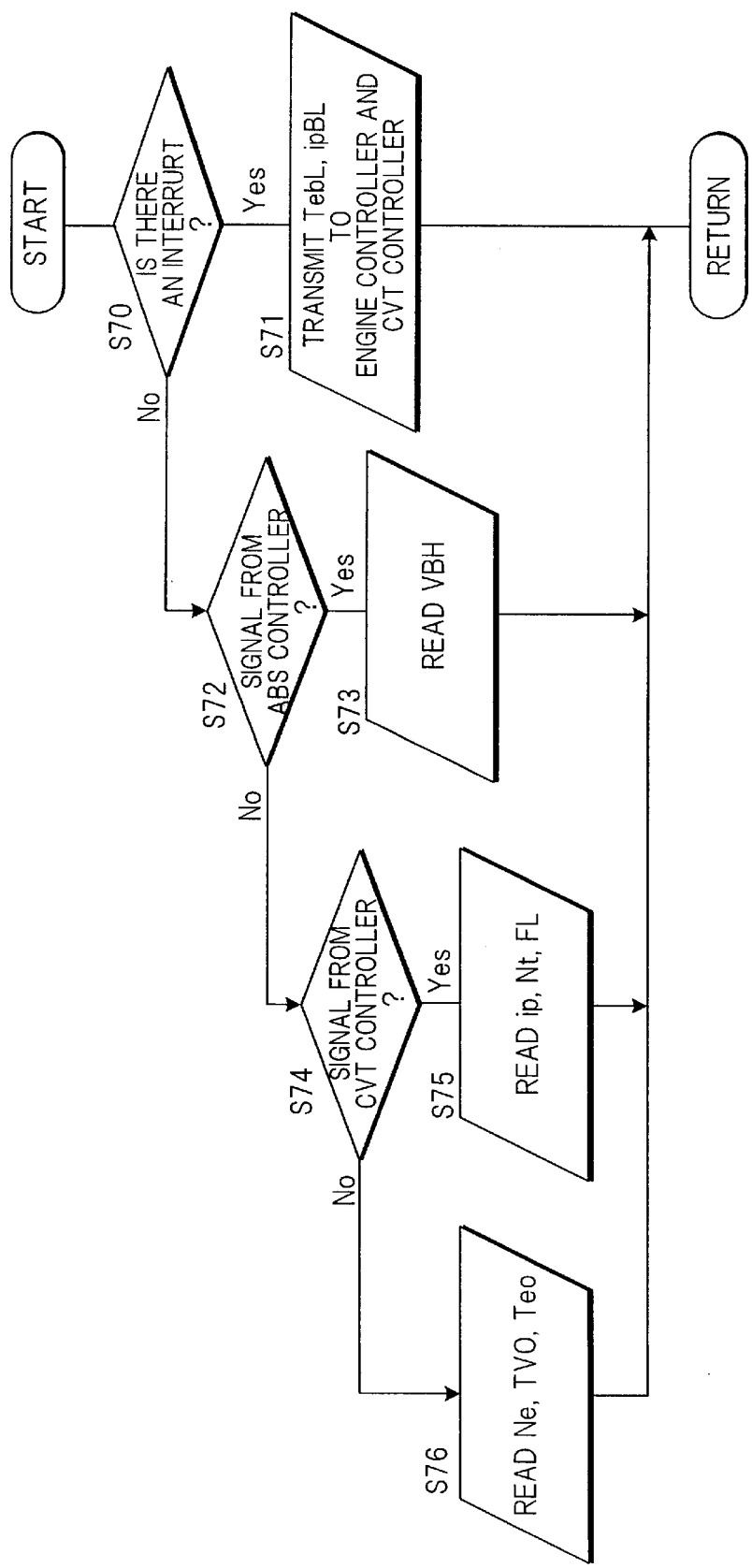
FIG. 7 is a flowchart describing a communication process performed by the drive shaft torque controller.

Next, the communication process between the other controllers 11, 20, 36 performed by the drive shaft controller 40 will be described referring to the flowchart shown in FIG. 7. This process is performed whenever there is an interrupt at a predetermined interval or a predetermined signal transmission from the engine controller 11, CVT controller 36 or ABS controller 20.

If there is an interrupt at a predetermined interval in a step S70, the routine proceeds to a step S71. If not, the routine proceeds to a step S72 and subsequent steps.

Figure 6:
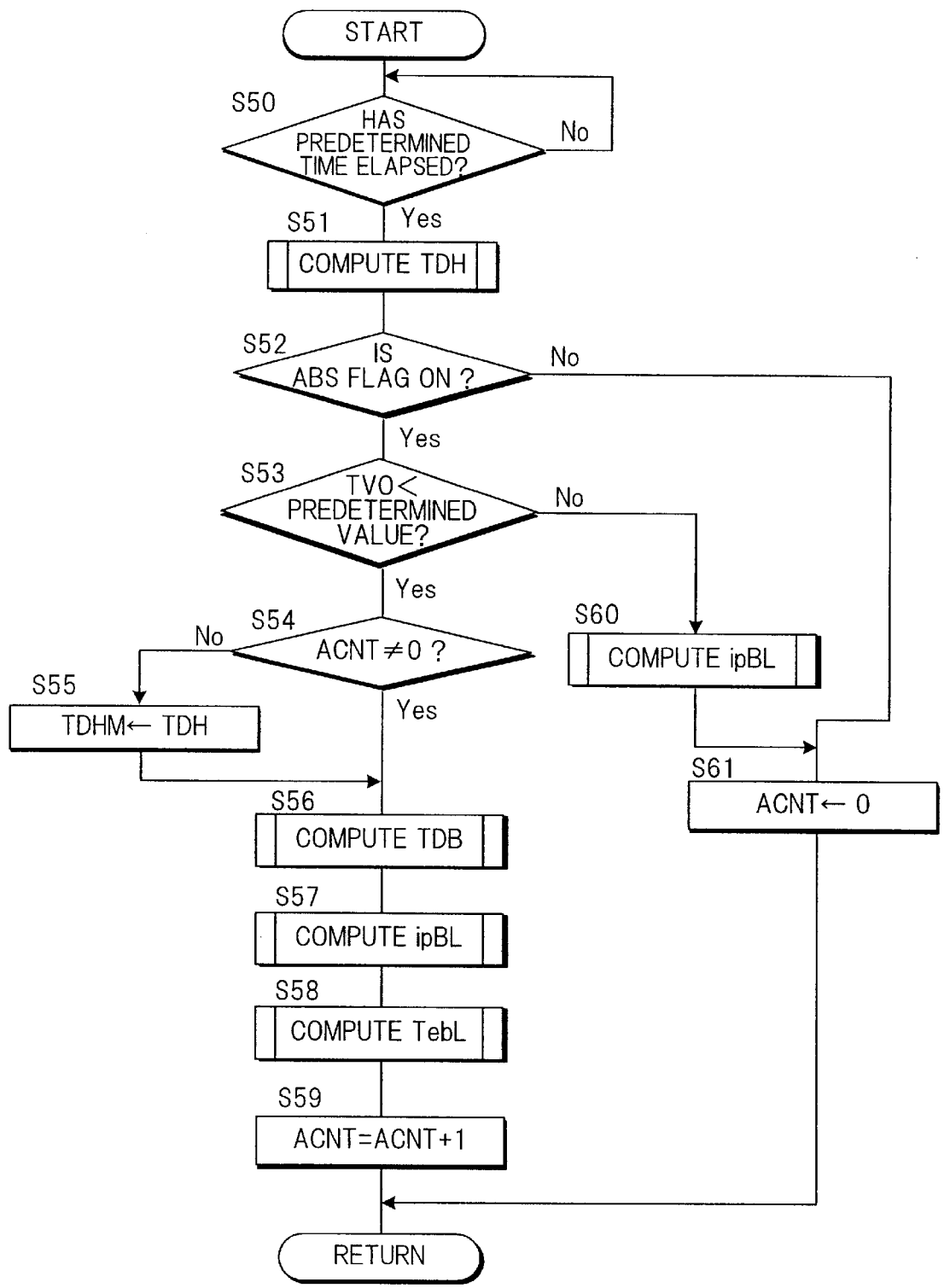
FIG. 6 is a flowchart describing a drive shaft torque control process performed by a drive shaft torque controller according to this invention.

In the step S71, the command torque TebL of the engine 10 and the command drive ratio ipBL of the CVT 30 computed in the steps S57, S58 of FIG. 6 are transmitted respectively to the engine controller 11 and CVT controller 36.

On the other hand, if there is a signal transmission from the ABS controller 20, the estimated vehicle speed VBH is read in a step S73. If there is a signal transmission from the CVT controller 36, the real drive ratio ip, primary pulley rotation speed Nt and lockup clutch engaging force FL are read in a step S75. If there is a signal transmission from the engine controller 11, the engine rotation speed Ne, throttle opening TVO and estimated torque Teo are read in a step S76.

Therefore, when antilock brake control is being performed and the throttle opening TVO is less than a predetermined value, the command drive ratio ipBL of the CVT30 and command torque TebL of the engine 10 are computed so as to obtain the drive shaft torque TDHM immediately prior to starting antilock brake control. The command drive ratio ipBL and command torque TebL are then transmitted respectively to the CVT controller 36 and engine controller 11.

Figure 10:
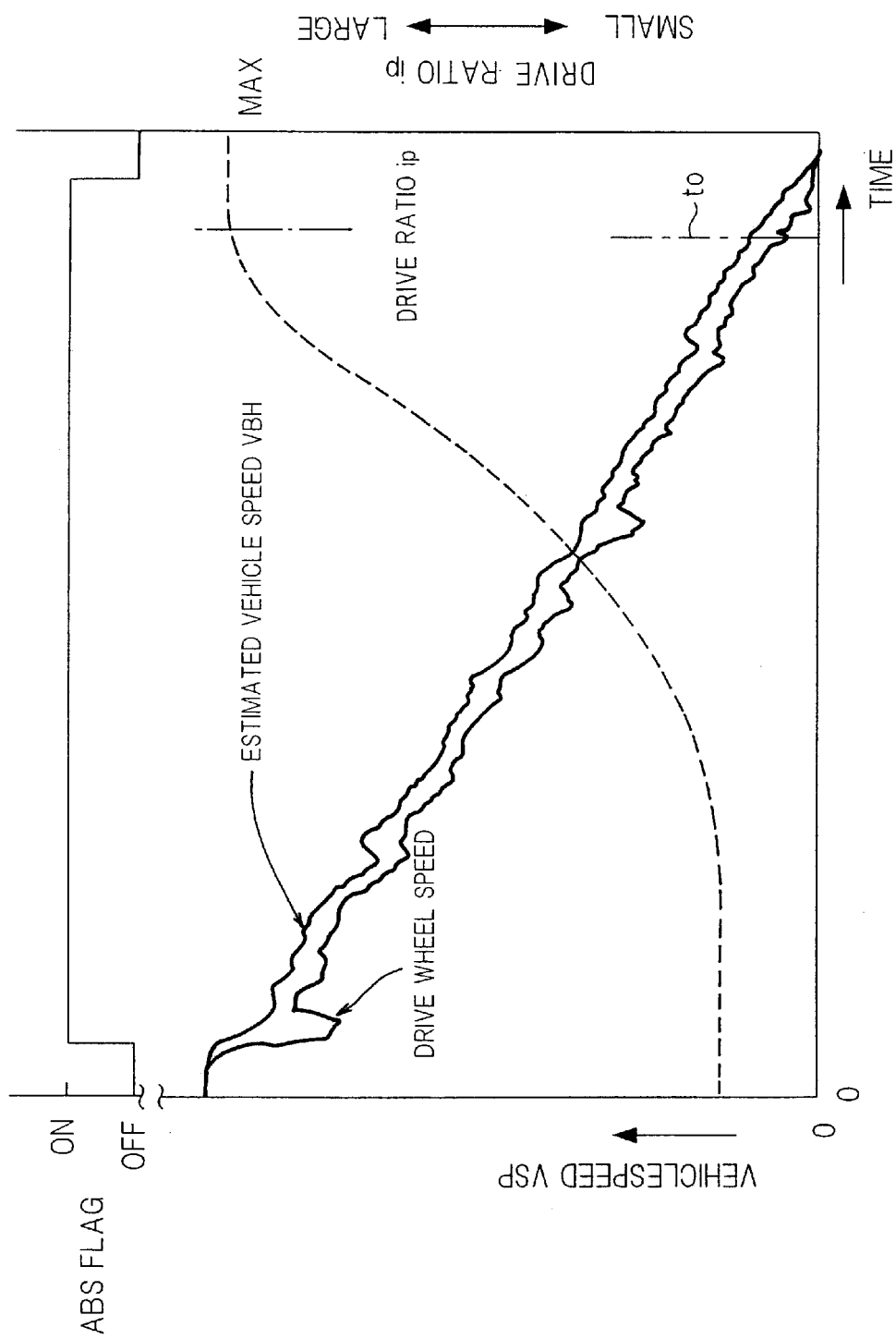
FIG. 10 is a timing chart showing a relation between estimated vehicle speed, drive wheel speed and drive ratio during antilock brake control.

While the ABS flag from the ABS controller 20 is ON, the engine controller 11 and CVT controller 36 temporarily stop the usual control. Control of the engine 10 and CVT 30 are then performed based on the command torque TebL and command drive ratio ipBL from the drive shaft torque controller 40. Hence even if the wheels lock, the wheels recover from the locked state immediately, as shown in FIG. 10. Further, when the vehicle has stopped, the real drive ratio ip changes to the maximum drive ratio, so the vehicle can be restarted without fail.

While antilock brake control is being performed, the drive shaft torque controller 40 determines the command drive ratio ipBL of the CVT 30 based on the estimated vehicle speed VBH estimated by the ABS controller 20, and control is performed by the command torque TebL according to this command drive ratio ipBL so that the drive shaft torque becomes the target drive shaft torque TDB. In this way, excessive fluctuation of the real drive ratio ip during antilock brake control is prevented and increase of engine braldng is suppressed, and there is a smooth transition to the maximum drive ratio.

The above embodiment was described with reference to the case where the CVT30 was a V-belt type transmission, but the same effect is obtained if it is applied to a toroidal type transmission.

The contents of Japanese Application No.9-217741, with a filing date Aug. 12, 1997, are hereby incorporated by reference.

The embodiments of this invention in which an exclusive property or privilege is claimed are defined as follows:

What is claimed:

1. A drive force control device for use with a vehicle comprising an engine, a drive shaft driven by said engine, drive wheels connected to said drive shaft, a continuously variable transmission which continuously varies a drive ratio, and a brake which brakes said drive wheels, said device comprising:

a sensor for detecting a running state of said vehicle, an engine controller for controlling a torque of said engine according to said vehicle running state, a CVT controller for controlling said drive ratio according to said vehicle running state, and an ABS controller for detecting a slip ratio of said drive wheels and controlling said brake to suppress the locking of said drive wheels when said slip ratio exceeds a predetermined threshold value, wherein said device further comprises a drive shaft torque controller programmed to:

compute a command torque of said engine and a command drive ratio of said transmission so that a torque of said drive shaft is a predetermined torque while said ABS controller is performing antilock brake control, output said command torque to said engine controller, and output said command drive ratio to said CVT controller.

2. A drive force control device as defined in claim 1, wherein said drive shaft torque controller is further programmed to compute said command torque of said engine based on a torque of said drive shaft immediately prior to starting antilock brake control.

3. A drive force control device as defined in claim 1, wherein said drive shaft torque controller is further programmed to limit said command torque of said engine so that said rotation speed of said engine is within a predetermined range.

4. A drive force control device as defined in claim 1, wherein said drive shaft torque controller is further programmed not to output said command torque and command drive ratio when a throttle opening is larger than a predetermined value.

* * * * *